UNITED STATES PATENT OFFICE.

HARMON HIBBARD, OF HENRIETTA, NEW YORK.

IMPROVEMENT IN TAWING AND COLORING SKINS AND FURS.

Specification forming part of Letters Patent No. 17,955, dated August 4, 1857.

*To all whom it may concern:*

Be it known that I, HARMON HIBBARD, of Henrietta, Monroe county, New York, have invented a new and useful compound and method of using it in the tawing and dressing of skins and coloring of fur, wool, or hair of different shades, in the same fluid at the same time when required, of which the following is a specification.

To enable others skilled in the art to make and use my compound, I will proceed to describe my method in full.

I first flesh, soak, and carefully clean the skins in the usual form for fur-skins to be tawed. I then spread them smooth in a warm place, with the flesh side up, then use a sponge to wet the flesh surface of each skin that requires it with a fluid which I term "No. 1," composed of the following ingredients: To two quarts warm water I add one pound sal-soda, with four ounces sulphuric acid gradually added and one ounce sulphate of iron, with agitation to blend the whole. The wetting will require to be repeated on muskrat and some heavy skins to serve as a laxative to prepare their interstices to receive the tawing-fluid with facility, without detriment to the fur or skins, and when saturated and nearly dry I apply another fluid to them in a like uniform manner, to produce and cause them to retain flexibility, which fluid I term "No. 2," and is composed of fish-oil, spirits turpentine, and alcohol, equal parts, which prepares them for the tawing-fluid. I then lay a suitable number of them into an iron kettle or tub containing that fluid which I term "No. 3," or the "tawing-fluid," which I compound in the following manner: For a brown shade on fur, wool, or hair I add to two gallons clean hot water eight ounces crude potash or one pound sal-soda, and with either I also add four ounces quicklime, one ounce acetate of lead, one ounce sulphate of iron, and one ounce prussiate of potash, then agitate to blend the whole; and while the fluid is kept at blood-heat I put in the skins and move them with a rod, that they may receive the fluid evenly from five to fifteen minutes, as required for the shade, then slick off the fluid to save it, and rinse the skins quick and clean in a running stream of water to prevent the fur from getting loose and to cleanse it. I then lay the skins smooth on the beam and slick out the water upon the flesh side, and when the pelt gets dry the immersion may be repeated, if required, to make them darker throughout; or the ends of the fur, when dry, may be wet by the use of a sponge with the same fluid until they are quite dark if placed in an even warm atmosphere or in the summer sun's rays, and when dark enough will require rinsing immediately, as before. But coon and other like porous skins that are loose and oily require no preparation after fleshing and cleaning before tawing; but as soon as they are taken from the tawing-fluid I use a slick lightly on the flesh side to remove all heterogeneous matter from the skin, then rinse them clean, carefully slick out the water, and spread them to dry. When dry, I damp the pelt, if hard, with the fluid No. 2, and soften it by means of rubbing over a stake-knife. The fur may afterward be cleansed by rubbing it in sawdust, or other substances of a like nature; but when I use sal-soda or potash liquor in the fluid for tawing only without coloring the fur, 1 omit the lime, but use one ounce of bichromate of potash in its stead for a yellow shade on light-colored fur. I use the lixivium and sal-soda fluid as permeators and vehicles to help carry the compound in solution, to effect the object set forth.

What I claim as my invention, and desire to secure by Letters Patent, is—

The compounding and using the composition which I term "No. 3," and use for tawing and coloring, as above described.

HARMON HIBBARD.

Witnesses:
HENRY H. SPERRY,
E. A. SPERRY.